United States Patent
Tsukano

(10) Patent No.: US 12,028,501 B2
(45) Date of Patent: Jul. 2, 2024

(54) CONTROL APPARATUS, COLOR ADJUSTMENT METHOD, AND STORAGE MEDIUM

(71) Applicant: KONICA MINOLTA, INC., Tokyo (JP)

(72) Inventor: Toshiki Tsukano, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 408 days.

(21) Appl. No.: 17/342,720

(22) Filed: Jun. 9, 2021

(65) Prior Publication Data
US 2022/0006921 A1 Jan. 6, 2022

(30) Foreign Application Priority Data
Jul. 1, 2020 (JP) .................................. 2020-113701

(51) Int. Cl.
H04N 1/60 (2006.01)
(52) U.S. Cl.
CPC ......... *H04N 1/6033* (2013.01); *H04N 1/6025* (2013.01); *H04N 1/6055* (2013.01)
(58) Field of Classification Search
CPC ... H04N 1/6033; H04N 1/6025; H04N 1/6055
See application file for complete search history.

(56) References Cited

U.S. PATENT DOCUMENTS

| 2004/0190019 A1* | 9/2004 | Li | H04N 1/6033 |
| | | | 358/3.08 |
| 2007/0058181 A1 | 3/2007 | Hatori | |
| 2019/0146735 A1* | 5/2019 | Tsukano | G06F 3/1208 |
| | | | 358/3.24 |

FOREIGN PATENT DOCUMENTS

| JP | 2007081480 A | 3/2007 |
| JP | 2016048900 A | 4/2016 |
| JP | 2019193117 A | 10/2019 |

OTHER PUBLICATIONS

Office Action (Notice of Reasons for Refusal) issued on Feb. 20, 2024, in corresponding Japanese Patent Application No. 2020-113701 and English translation of the Office Action. (8 pages).

* cited by examiner

*Primary Examiner* — Christopher Wait
(74) *Attorney, Agent, or Firm* — BUCHANAN INGERSOLL & ROONEY PC

(57) ABSTRACT

A control apparatus includes a controller. The controller obtains a job which is executed by a print apparatus and which is corresponded to document image data. The controller obtains read image data of a color sample corresponding to the document image data from a scanner. The controller determines whether correction of the scanner and/or the print apparatus is necessary based on the read image data. The controller corrects the scanner and/or the print apparatus based on a result of determination. The controller generates a color conversion parameter regarding a color conversion of the document image data based on a profile corresponding to the scanner and/or the print apparatus after correction, the document image data, and the read image data.

11 Claims, 11 Drawing Sheets

CONTROL APPARATUS, COLOR ADJUSTMENT METHOD, AND STORAGE MEDIUM

CROSS-REFERENCE TO RELATED APPLICATIONS

The entire disclosure of Japanese Patent Application No 2020-113701 filed on Jul. 1, 2020 is incorporated herein by reference in its entirety.

BACKGROUND

Technological Field

The present invention relates to a control apparatus, a color adjustment method, and a storage medium.

Description of the Related Art

In stores where printing is performed, when the store receives an order to print based on document image data from a client, the store may receive an output product (color sample) as a target. In such situation, in order to reproduce a color in the color sample (target output), a color conversion table used in color conversion of the document image data is corrected from a relation of the colors between read image data (RGB value) obtained by reading the color sample and the document image data (CMYK value). With this, the color is matched (see JP 2016-48900).

Specifically, software to create the color conversion parameter (ICC profile) is started, and the color sample is read by a scanner. Based on the read image data and the document image data, the color conversion parameter which reproduces the color closer to the color sample is created and the color conversion parameter is registered in a database. With this, the color is matched. When such color matching is performed, correction of the scanner which reads the color sample and correction of a print apparatus which prints after adjustment (color matching) are suitably performed in order to enhance accuracy of color matching.

SUMMARY

However, the user cannot determine the necessity of correction of the scanner and the correction of the print apparatus. Therefore, the correction of the scanner and the print apparatus is performed each time the color conversion parameter is generated. This causes the problem that the amount of time of work increases.

The present invention is conceived in view of the above problems of the conventional techniques, and the purpose of the present invention is to shorten the amount of time of the work and to increase the efficiency when color accuracy is enhanced in color adjustment.

To achieve at least one of the abovementioned objects, according to an aspect of the present invention, a control apparatus reflecting one aspect of the present invention is shown, the apparatus including a controller, wherein, the controller obtains a job which is executed by a print apparatus and which is corresponded to document image data; the controller obtains read image data of a color sample corresponding to the document image data from a scanner; the controller determines whether correction of the scanner and/or the print apparatus is necessary based on the read image data; the controller corrects the scanner and/or the print apparatus based on a result of determination; and the controller generates a color conversion parameter regarding a color conversion of the document image data based on a profile corresponding to the scanner and/or the print apparatus after correction, the document image data, and the read image data.

According to another aspect, a control adjustment method executed by a controller of a control apparatus, the method including, obtaining a job which is executed by a print apparatus and which is corresponded to document image data; obtaining read image data of a color sample corresponding to the document image data from a scanner; determining whether correction of the scanner and/or the print apparatus is necessary based on the read image data; correcting the scanner and/or the print apparatus based on a result of determination; and generating a color conversion parameter regarding a color conversion of the document image data based on a profile corresponding to the scanner and/or the print apparatus after correction, the document image data, and the read image data.

According to another aspect, a non-transitory computer-readable storage medium storing a program causing a controller of a computer to perform: obtaining a job which is executed by a print apparatus and which is corresponded to document image data; obtaining read image data of a color sample corresponding to the document image data from a scanner; determining whether correction of the scanner and/or the print apparatus is necessary based on the read image data; correcting the scanner and/or the print apparatus based on a result of determination; and generating a color conversion parameter regarding a color conversion of the document image data based on a profile corresponding to the scanner and/or the print apparatus after correction, the document image data, and the read image data.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments.

Below, an embodiment of a control apparatus according to the present invention is described with reference to the drawings. However, the scope of the present invention is not limited by the illustrated examples.

First Embodiment

Figure 1:
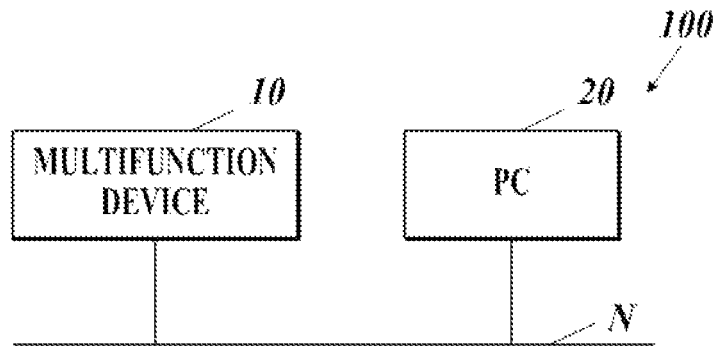
FIG. 1 is a diagram showing a system configuration of a print system according to a first embodiment of the present invention.

FIG. 1 shows a system configuration of a print system 100 according to a first embodiment. As shown in FIG. 1, the print system 100 includes a multifunction device 10 and a PC (Personal Computer) 20 as a control apparatus. The multifunction device 10 and the PC 20 are connected to be able to communicate data through a communication network N such as a LAN (Local Area Network), etc. The print system 100 is provided in a print company, etc.

The multifunction device 10 includes a printer function which forms an image on a sheet and a scanner function which reads an image on a sheet. The multifunction device 10 performs computing processes such as a color conversion process, a rasterizing process, a screening process, and the like on image data which is to be printed, and generates print image data (CMYK value). With this, a printing process is performed based on the print image data.

The PC 20 corrects a target profile, a device link profile, etc. when the color of the output from the multifunction device 10 is matched to the color of the color sample (target output), and a corrected result is provided to the multifunction device 10. The color sample is output received from a customer when the customer submits the document. This is not data but the actual output. The PC 20 transmits a print instruction including the image data to be printed to the multifunction device 10.

Figure 2:
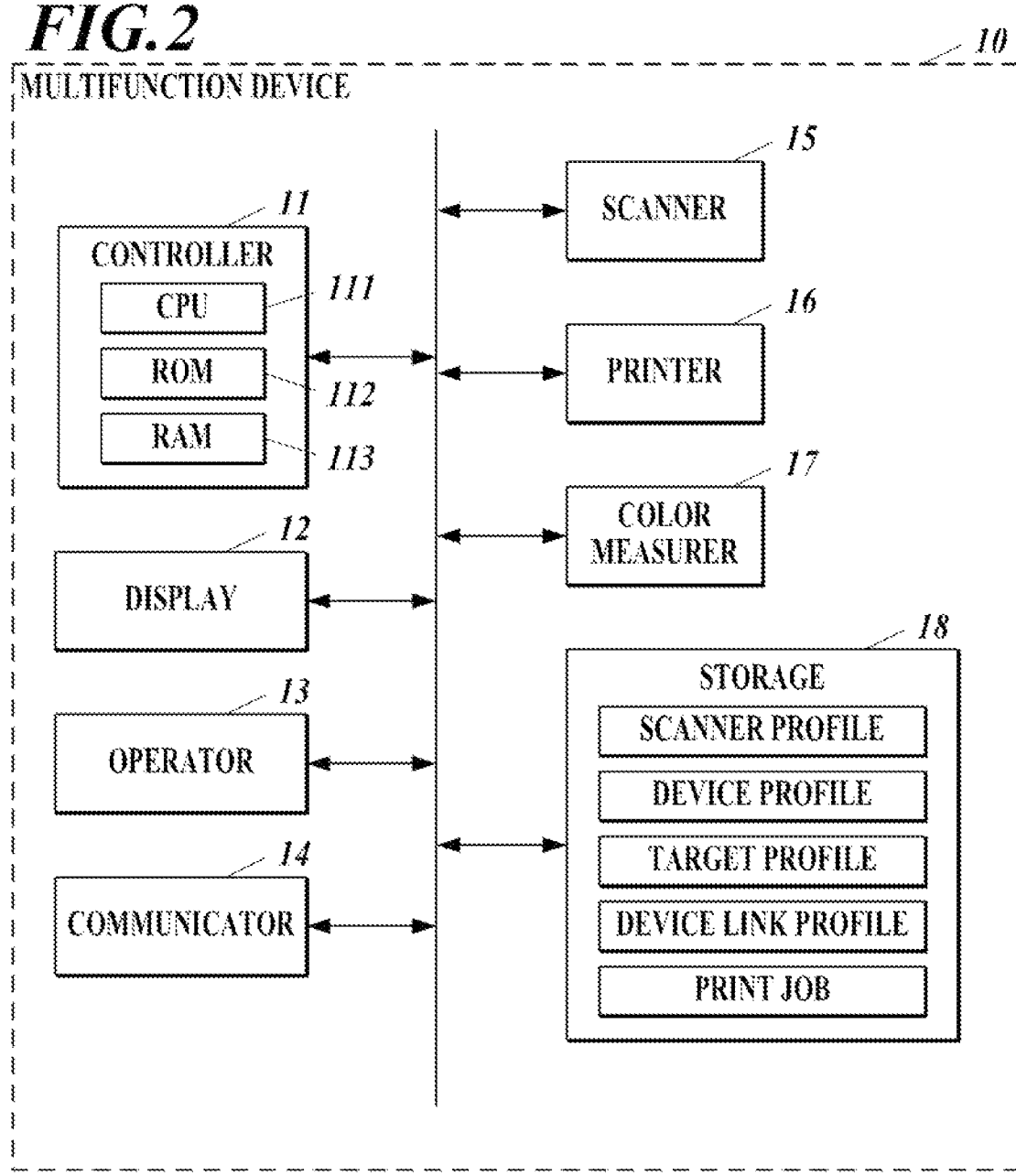
FIG. 2 is a block diagram showing a functional configuration of a multifunction device.

FIG. 2 shows a functional configuration of the multifunction device 10. As shown in FIG. 2, the multifunction device 10 includes a controller 11, a display 12, an operator 13, a communicator 14, a scanner 15, a printer 16, a color measurer 17, and a storage 18.

The controller 11 includes a Central Processing Unit (CPU) 111, a Read Only Memory (ROM) 112, a Random Access Memory (RAM) 113, and the like. The controller 11 controls each unit in the multifunction device 10. The CPU 111 reads various programs stored in the ROM 112 and deploys the program in the RAM 113, and according to the deployed program, various processes are executed. The ROM 112 is a read only memory which stores various programs and various data. The RAM 113 functions as a work space and temporarily stores the programs and data.

The display 12 includes a Liquid Crystal Display (LCD) and the display 12 displays various screens according to an instruction of a display signal input from the controller 11.

The operator 13 generates an operation signal in response to an operation by the user and outputs the operation signal to the controller 11. The operator 13 includes a touch panel layered on the display 12 and an operation key.

The communicator 14 includes a network interface and transmitting and receiving of data are performed with an external device connected through a communication network N.

The scanner 15 reads sheets placed on a document stage or the color sample, and generates read image data (RGB value) including pixel values in the colors red (R), green (G), and blue (B).

The printer 16 uses four process colors including cyan (C), magenta (M), yellow (Y), and black (K). Color materials such as toner, ink or the like in the colors CMYK are used to form an image on a sheet. The printer 16 performs a printing process based on the print image data (CMYK value).

The color measurer 17 is a color measurer (inline color measurer) provided on a conveying path of the sheet on which printing is performed by the printer 16. The color measurer 17 measures the color of the image printed on the sheet and outputs a color value (L*a*b* value).

The storage 18 is a storage apparatus which stores various programs and various data.

For example, the storage 18 stores a scanner profile, a device profile (printer profile), a target profile, and a device link profile.

The scanner profile shows a relation between a read value (RGB value) by the scanner 15 and a color value (L*a*b* value) of the target to be read (read properties by the scanner 15).

The device profile shows a relation between the print image data (CMYK value) output to the printer 16 and the color value (L*a*b* value) of the printed material (output properties of the printer 16).

The target profile shows a relation between the document image data (CMYK value) input to a target printer which printed the color sample and the color value (L*a*b* value) obtained from the color sample.

The device link profile is a CMYK-CMYK device link profile generated by the target profile and the device profile. The device link profile shows the relation between the CMYK value of the document image data and the CMYK value output to the printer 16.

The storage 18 stores a print job printed by the printer 16 of the multifunction device 10. The print job includes document image data which is the print target and job setting which shows how the printing is performed. The job setting includes information showing the color conversion parameter (target profile, device link profile) used in the color conversion on the document image data, number of copies, magnification rate, post-processing setting, and the like.

Figure 3:
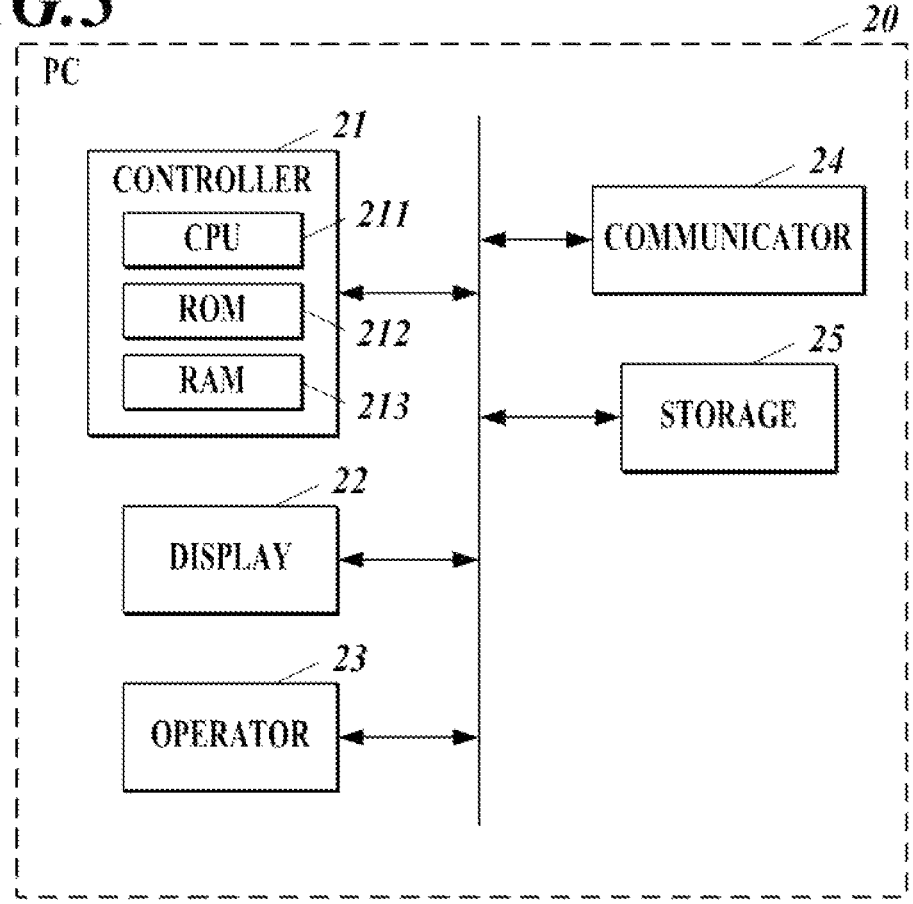
FIG. 3 is a block diagram showing a functional configuration of a PC.

FIG. 3 shows a functional configuration of the PC 20. As shown in FIG. 3, the PC 20 includes a controller 21, a display 22, an operator 23, a communicator 24, and a storage 25.

The controller 21 includes a CPU 211, a ROM 212, a RAM 213, and the like, and the controller 21 controls the sections in the PC 20. The CPU 211 reads various programs stored in the ROM 212 or the storage 25 and deploys the program in the RAM 213. The CPU 211 executes various processes according to the deployed program. The ROM 212 is a read only memory which stores various programs and various data. The RAM 213 functions as a workspace and temporarily stores the programs and data.

The display 22 includes a LCD monitor, and displays various screens according to the instruction of the display signal input from the controller 21.

The operator 23 includes a keyboard including cursor keys, letter input keys, various function keys, and the like and a pointing device such as a mouse. The operator 23 outputs to the controller 21 the operation signal input by the key operation on the keyboard and the mouse operation. The operator 23 may include a touch panel layered on the display 22, and the operation signal according to the position touched by the finger, etc. of the user can be output to the controller 21.

The communicator 24 includes a network interface and transmits and receives data with the external device connected through the communication network N.

The storage 25 is a storage apparatus which stores various programs and various data.

Figure 4:
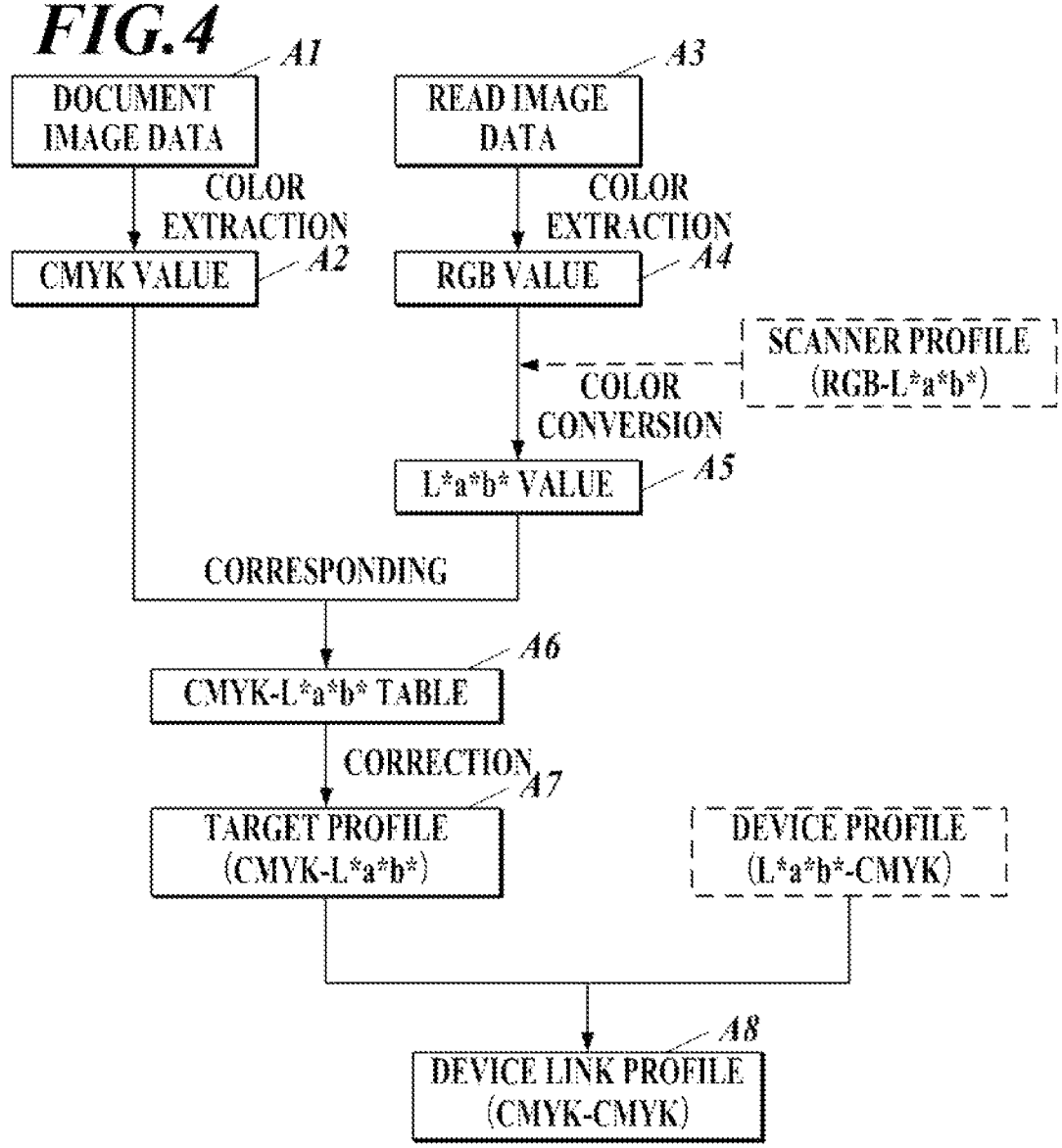
FIG. 4 is a diagram describing a flow of generating a color conversion parameter.

Next, with reference to FIG. 4, the flow of generating the color conversion parameter (target profile and device link profile) is described.

First, the document image data (A1) corresponded to the color sample is obtained, and the CMYK value (A2) of each pixel is extracted from the document image data (A1). The document image data is image data which is the source from which the color sample is printed, and data received from the customer. For example, a PDF file, a TIFF file, and the like are used as the document image data.

The read image data (A3) obtained by reading the color sample with the scanner 15 is obtained, and the RGB value (A4) of each pixel is extracted from the read image data (A3). For example, the PDF file, the TIFF file, etc. are used as the read image data.

The target profile which is to be corrected is a look-up table (LUT) of CMYK-L*a*b. Therefore, color conversion is performed from the RGB value (A4) extracted from the read image data to the L*a*b*value (A5) using the scanner profile (RGB-L*a*b*LUT).

Next, the CMYK-L*a*b* table (A6) is created corresponding the CMYK value (A2) to the L*a*b* value (A5) in the corresponding positions in the document image data and the read image data. Specifically, the feature point such as the edge (outline), corner, etc. is extracted from each of the document image data and the read image data, and the positioning of the document image data and the read image data is performed based on the feature point. For each position corresponded to each other, the combination of the CMYK value (A2) of the document image data and the L*a*b* value (A5) obtained from the read image data is stored in the CMYK-L*a*b* table (A6).

Next, the target profile (CMYK-L*a*b*) (A7) is corrected based on the CMYK-L*a*b* table (A6).

Next, the target profile (A7) and the device profile (L*a*b*-CMYK) to accurately reproduce the color with the printer 16 are combined to generate (correct) the device link profile (A8). The device link profile is applied to the print job so as to be able to perform color matching.

In the PC 20, when the scanner profile, the device profile, the target profile, and the device link profile are used, the controller 21 obtains various profiles stored in the storage 18 of the multifunction device 10 through the communicator 24. The controller 21 obtains various profiles in advance from the storage 18 of the multifunction device 10, and the various profiles are stored in the storage 25.

The controller 21 obtains the job corresponded to the document image data (CMYK value). This job is the print job executed by the printer 16 of the multifunction device 10.

The controller 21 obtains the read image data (RGB value) of the color sample corresponded to the document image data from the scanner 15 (multifunction device 10).

The controller 21 determines whether correction of the scanner 15 and/or the printer 16 (print apparatus) is necessary based on the read image data of the color sample.

The controller 21 corrects the scanner 15 and/or the printer 16 based on the determined result.

The controller 21 generates the color conversion parameter (device link profile) regarding the color conversion of the document image data based on the profile corresponding to the scanner 15 and/or the printer 16 after correction, the document image data, and the read image data of the color sample.

When it is determined that the correction of the scanner 15 and/or the printer 16 is necessary, the controller 21 switches the screen displayed on the display 22 to the screen for performing the correction operation. After the scanner 15 and/or the printer 16 is corrected, the controller 21 switches the screen to a predetermined screen.

When it is determined that the correction of the scanner 15 and/or the printer 16 is not necessary, the controller 21 does not switch the screen displayed on the display 22 to the screen for performing the correction operation, and switches the screen to the predetermined screen.

As the correction of the scanner 15, the controller 21 allows the scanner 15 to read a predetermined chart, and the scanner profile corresponding to the scanner 15 is corrected.

As the correction of the printer 16 (print apparatus), the controller 21 allows the printer 16 to print the predetermined chart and to measure the color of the predetermined chart. With this, the device profile corresponding to the printer 16 is corrected.

As the correction of the printer 16 (print apparatus), the controller 21 allows the printer 16 to print a predetermined chart, and to measure the color of the predetermined chart. With this, the device profile corresponding to the printer 16 is corrected. As the correction of the scanner 15, the controller 21 allows the scanner 15 to read the predetermined chart, and the scanner profile corresponding to the scanner 15 is corrected. That is, when both the correction of the printer 16 and the correction of the scanner 15 need to be performed, the same chart printed in the printer 16 can be used for correcting the device profile corresponding to the printer 16 and the scanner profile corresponding to the scanner 15.

Next, the operation of the PC 20 is described.

Figure 5:
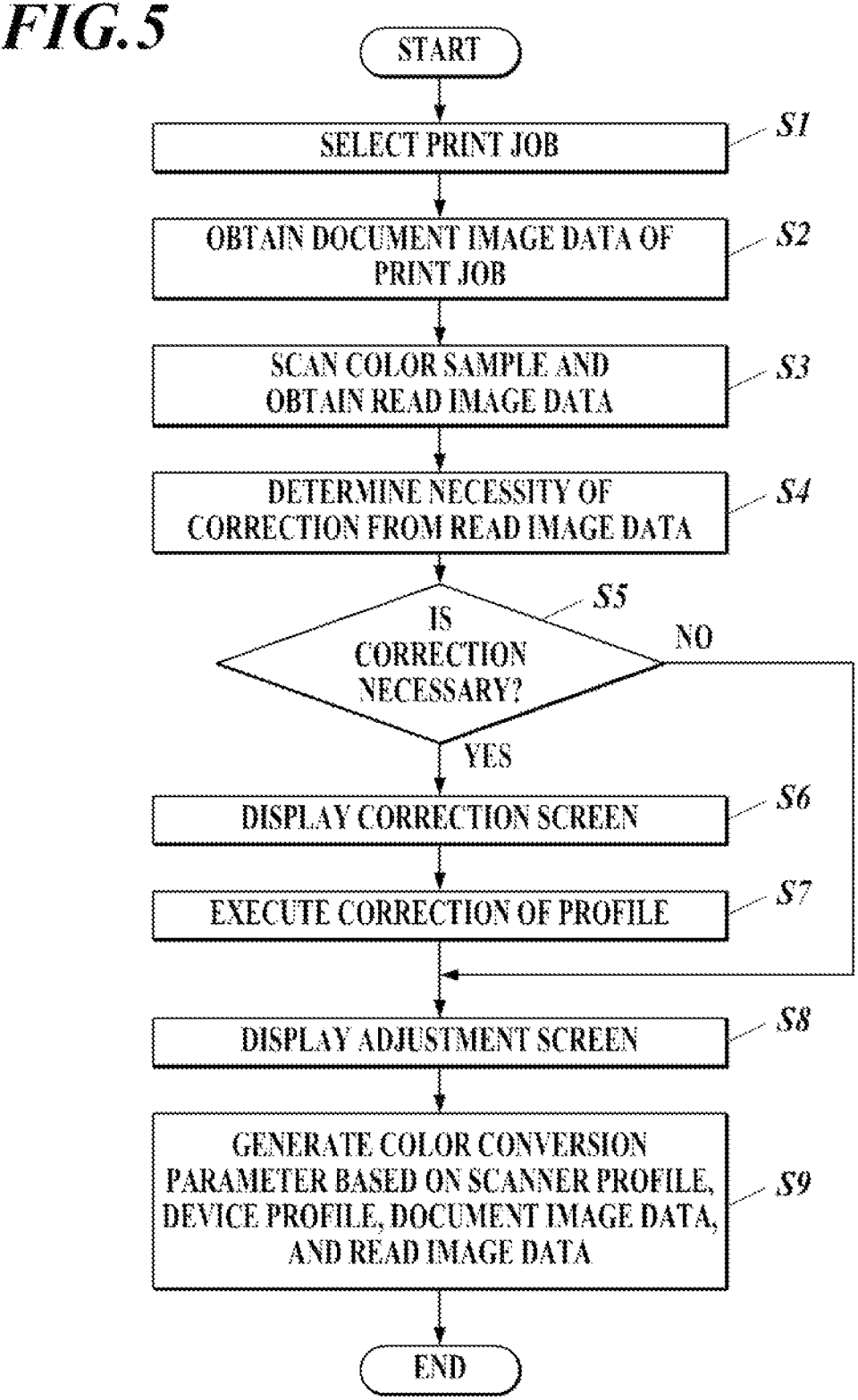
FIG. 5 is a flowchart showing a first color adjustment process.

FIG. 5 is a flowchart showing a first color adjustment process performed by the PC 20. This process is executed according to a software process by the CPU 211 of the controller 21 in coordination with the program stored in the storage 25.

First, through the communicator 24, the controller 21 displays as a list on the display 22 a plurality of print jobs stored in the storage 18 of the multifunction device 10.

Figure 6:
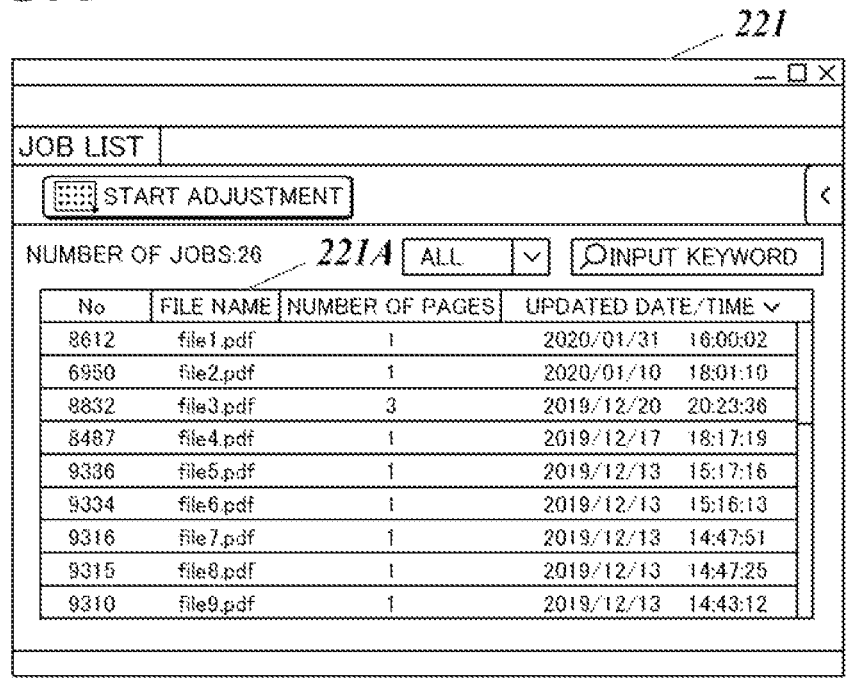
FIG. 6 is a diagram showing an example of a job list screen.

FIG. 6 shows the example of the job list screen 221 displayed on the display 22. The job list screen 221 includes the job list display region 221A. A list of the print jobs is displayed on the job list display region 221A, and a job number, a file name (document image data), number of pages, and updated date/time are displayed for each print job.

The controller 21 receives a selection of the print job from the operator 23 by the user on the job list screen 221 (step S1). The user operates the operator 23 and selects the print job as the target of adjustment from the plurality of jobs displayed on the list. Through the communicator 24, the controller 21 obtains the selected print job from the storage 18 of the multifunction device 10. The controller 21 stores the selected print job in the storage 25.

Next, the controller 21 obtains the document image data (document image data corresponding to the color sample) (CMYK value) corresponded to the selected print job (step S2). The controller 21 stores the obtained document image data in the storage 25.

When the document image data includes a plurality of pages, the page used for adjustment is specified by the user.

Next, the controller 21 displays the color sample scan screen on the display 22.

Figure 7:
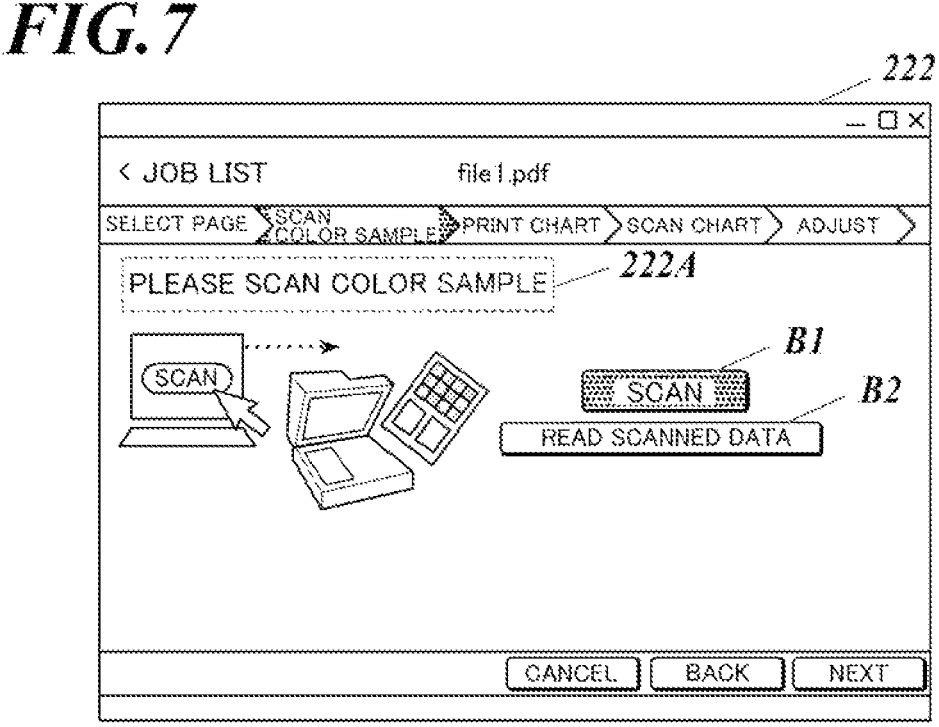
FIG. 7 is a diagram showing an example of a color sample scan screen.

FIG. 7 shows an example of the color sample scan screen 222 displayed on the display 22. The color sample scan screen 222 includes an operation guide region 222A, a scan button B1, a read button B2, and the like.

The operation guide region 222A displays the guide regarding the operation to scan the color sample.

The scan button B1 is a button to instruct the scanner 15 of the multifunction device 10 to execute the scanning of the color sample.

The read button B2 is a button to instruct reading of the read image data of the color sample scanned by the scanner 15 of the multifunction device 10.

When the user places the color sample on the scanner 15 and presses the scan button B, the scanner 15 scans the color sample, and the read image data (RGB value) is generated. After the scanning is finished, when the user presses the read button B2, the controller 21 obtains the read image data (RGB value) from the scanner 15 (multifunction device 10) through the communicator 24 (step S3). The controller 21 stores the obtained read image data in the storage 25.

Next, the controller 21 determines whether the correction of the scanner 15 and/or the printer 16 is necessary based on the read image data of the color sample (step S4).

When it is determined that the correction of the scanner 15 and/or the printer 16 is necessary (step S5; YES), the controller 21 displays a correction screen on the display 22 (step S6).

Figure 8:
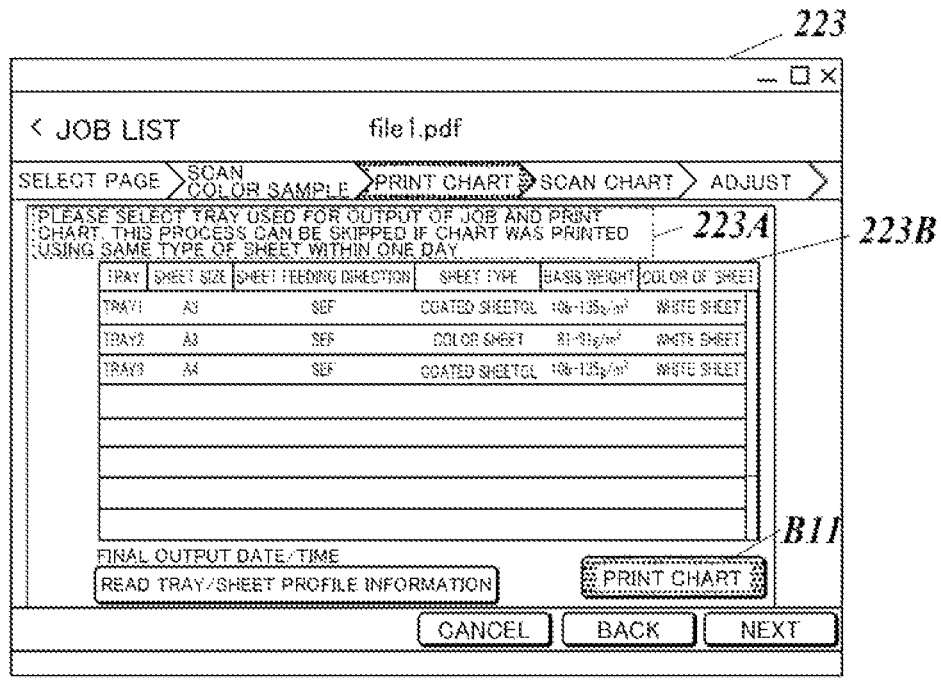
FIG. 8 is a diagram showing an example of a device profile correction screen.

FIG. 8 shows an example of a device profile correction screen 223 displayed on a display 22. The device profile correction screen 223 is displayed when it is determined that it is necessary to correct the device profile corresponding to the printer 16. The device profile correction screen 223 includes an operation guide region 223A, tray selecting region 223B, chart print button B11, and the like.

A guide regarding the operation to print the chart (printer correction) is displayed on the operation guide region 223A.

Information regarding a sheet feeding tray included in the multifunction device 10 is displayed in the tray selecting region 223B. The user selects the tray corresponding to the sheet used when the job is output from the tray displayed in the tray selecting region 223B.

The chart print button B11 is a button to instruct printing of the chart to the printer 16 of the multifunction device 10. Patches in plurality of colors are included in the chart.

When the user presses the chart print button B11, the printer 16 prints the chart on the sheet in the tray selected in the tray selecting region 223B, and the color of the chart is measured by the color measurer 17 (inline color measurer). With this, the correction of the device profile (re-creating) is performed.

Figure 9:
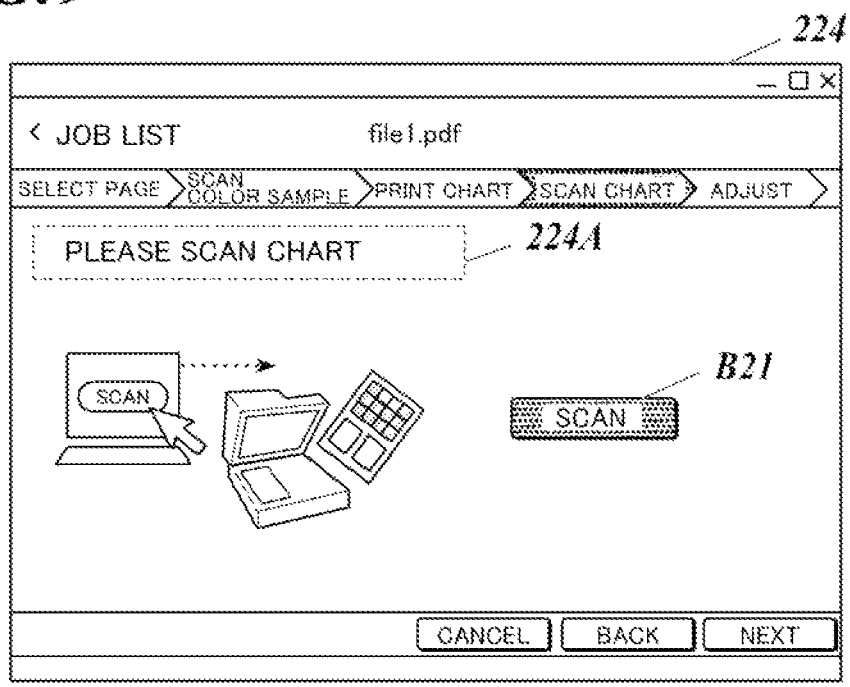
FIG. 9 is a diagram showing an example of a scanner profile correction screen.

FIG. 9 shows an example of a scanner profile correction screen 224 displayed on the display 22. The scanner profile correction screen 224 is displayed when it is determined that the scanner profile corresponding to the scanner 15 needs to be corrected. The scanner profile correction screen 224 includes an operation guide region 224A, a scan button B21, and the like.

An operation guide regarding the scanning of the chart (scanner correction) is displayed in the operation guide region 224A.

The scan button B21 is a button to instruct the executing of the scan of the chart to the scanner 15 of the multifunction device 10.

When the user places the chart on the scanner 15, and presses the scan button B21, the scanner 15 scans the chart.

When it is determined that the correction of the device profile is necessary, the device profile correction screen 223 is displayed, and the device profile is corrected, the chart printed when the device profile is corrected is read by the scanner 15. With this, the scanner profile is corrected.

When it is determined that the correction of the device profile is not necessary, the chart including the plurality of patches in which the color value is known in advance is read by the scanner 15, and with this, the correction of the scanner profile is performed.

After step S6, the controller 21 executes the correction of the profile corresponding to the scanner 15 and/or the printer 16 which is determined that it is necessary to perform correction (step S7).

When the correction of the scanner 15 is necessary, the controller 21 executes the correction of the scanner profile corresponding to the scanner 15. Specifically, the controller 21 controls the scanner 15 of the multifunction device 10 to scan the chart, and obtains the read image data (RGB value) of the chart from the scanner 15 (multifunction device 10) though the communicator 24. Then, the controller 21 corrects the scanner profile based on the read value (RGB value) of each patch by the scanner 15 and the color value of each patch (L*a*b value).

When the correction of the printer 16 is necessary, the controller 21 performs the correction of the device profile corresponding to the printer 16. Specifically, the controller 21 controls the printer 16 of the multifunction device 10 to print the chart, controls the color measurer 17 of the multifunction device 10 to measure the color of the chart printed by the printer 16, and obtains the color measurement result (L*a*b* value) of the chart from the multifunction device 10 through the communicator 24. Then, the controller 21 corrects the device profile based on the print image data (CMYK value) corresponding to each patch in the printed chart and the color measurement result (L*a*b* value) of the chart.

After step S7, or in step S5, when it is determined that the correction of the scanner 15 and the correction of the printer 16 are both not necessary (step S5; NO), the controller 21 displays the adjustment screen (color conversion parameter generating screen) on the display 22 (step S8).

Figure 10:
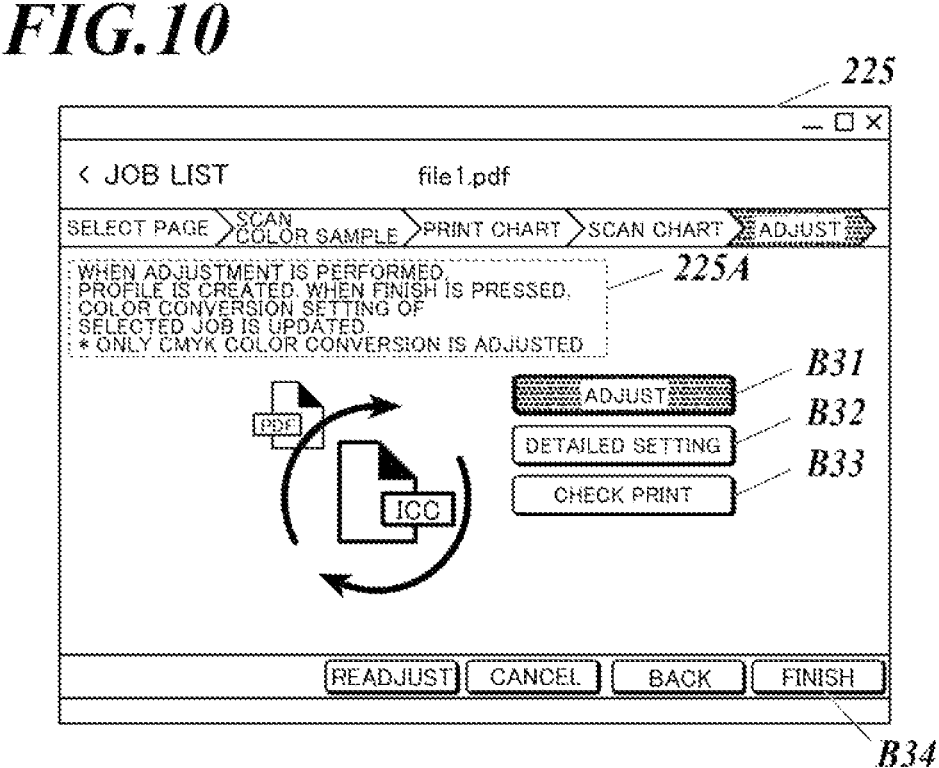
FIG. 10 is a diagram showing an example of an adjustment screen.

FIG. 10 shows an example of an adjustment screen 225 displayed on the display 22. The adjustment screen 225 includes an operation guide region 225A, an adjust button B31, a detailed setting button B32, a check print button B33, a finish button B34, and the like.

The operation guide region 225A displays a guide regarding the operation used in the adjustment (color matching).

The adjust button B31 is the button to instruct executing of the adjustment (generating a device link profile).

The detailed setting button B32 is the button to perform the detailed setting regarding the adjustment.

The check print button B33 is the button to instruct check printing using the generated device link profile. According to such printing for the purpose of checking, it is possible to set the device link profile, perform the printing, and check whether the desired color adjustment can be achieved before reflecting the correction of the device link profile (color conversion parameter).

The finish button B34 is a button to instruct the generated device link profile to be applied to the selected print job.

When the user presses the adjust button B31, the controller 21 generates the color conversion parameter (device link profile) regarding the color conversion on the document image data based on the scanner profile corresponding to the scanner 15, the device profile corresponding to the printer 16, the document image data, and the read image data of the color sample (step S9). The method to correct the device link profile is described with reference to FIG. 4. The controller 21 stores the generated color conversion parameter in the storage 25.

Then, when the user presses the finish button B34, the controller 21 applies the color conversion parameter (device link profile) generated in step S9 to the print job selected in step S1. Specifically, the controller 21 sets the color conversion parameter in the job setting of the print job and automatically corresponds the color conversion parameter to the print job.

In detail, the controller 21 transmits to the multifunction device 10 through the communicator 24 the corrected device link profile (color conversion parameter) corresponded to the print job. In the multifunction device 10, the job setting (color conversion setting) of the print job is updated in the storage 18 in the state corresponded to the new color conversion parameter.

With this, the first color adjustment process ends.

As described above, the controller 21 of the PC 20 corrects the scanner profile and/or the device profile as necessary and generates the device link profile.

The controller 21 transmits to the multifunction device 10 through the communicator 24 the corrected scanner profile and/or the device profile, and the corrected target profile and the device link profile. In the multipurpose device 10, the controller 11 stores the various profiles transmitted from the PC 20 in the storage 18.

When the multifunction device 10 performs the printing regarding the print job, the controller 11 performs the color conversion from the document image data (CMYK value) to the print image data (CMYK value) using the device link profile corresponded to the print job. Then, the printer 16 performs the printing based on the print image data (CMYK value). With this, the color aiming for the color sample can be achieved.

Here, the switch of the screen on the display 22 of the PC 20 is described.

When the correction of the scanner profile corresponding to the scanner 15 and the device profile corresponding to the printer 16 is not necessary, the screen switches in the following order, the job list screen 221 (see FIG. 6), color sample scan screen 222 (see FIG. 7), and adjustment screen 225 (see FIG. 10). That is, when it is determined that the correction of the scanner 15 and the printer 16 is not necessary, the screen on the display 22 does not switch to the screen to operate the correction (device profile correction screen 223, scanner profile correction screen 224), and the screen switches to the predetermined screen (adjustment screen 225).

When it is necessary to correct only the scanner profile corresponding to the scanner 15, the screen switches in the following order, the job list screen 221 (see FIG. 6), the color sample scan screen 222 (see FIG. 7), the scanner profile correction screen 224 (see FIG. 9), and the adjustment screen 225 (see FIG. 10). That is, when it is determined that the correction of the scanner 15 is necessary, the screen on the display 22 switches to the screen for the correction operation (scanner profile correction screen 224), and the screen switches to the predetermined screen (adjustment screen 225) after correction of the scanner 15.

When it is necessary to correct only the device profile corresponding to the printer 16, the screen switches in the following order, the job list screen 221 (see FIG. 6), the color sample screen 222 (see FIG. 7), the device profile correction screen 223 (see FIG. 8), and adjustment screen 225 (see FIG. 10). That is, when it is determined that the correction of the printer 16 is necessary, the screen on the display 22 switches to the screen for the correction operation (device profile correction screen 223), and the screen switches to the predetermined screen (adjustment screen 225) after correction of the printer 16.

When it is necessary to correct both the scanner profile corresponding to the scanner 15 and the device profile corresponding to the printer 16, the screen switches in the following order, the job list screen 221 (see FIG. 6), the color sample scan screen 222 (see FIG. 7), the device profile correction screen 223 (see FIG. 8), the scanner profile correction screen 224 (see FIG. 9), and the adjustment screen 225 (see FIG. 10). That is, when it is determined that the correction of the scanner 15 and the printer 16 is necessary, the screen on the display 22 is switched to the screen for the correction operation (device profile correction screen 223, scanner profile correction screen 224), and the screen switches to the predetermined screen (adjustment screen 225) after the correction of the printer 16 and the scanner 15.

As described above, according to the first embodiment, in the print system 100 which generates the color conversion parameter (ICC profile) from the corresponding relation of the colors between the read image data obtained by reading the color sample (target output) and the document image data corresponding to the color sample, it is determined whether correction of the scanner 15 and/or the printer 16 (print apparatus) is necessary based on the read image data of the color sample. When it is determined that correction is necessary, the scanner 15 and/or the printer 16 is corrected and then the color conversion parameter (device link profile) can be generated. Therefore, the time for work necessary to enhance the accuracy of the color in color adjustment can be shortened and the work can be made more efficient.

In each of the scanner 15, and the printer 16, the display of the operation screen can be switched based on the result of determination of whether correction is necessary. Therefore, the user is able to perform correction according to the displayed operation screen. The correction screen is displayed only when the correction is necessary. Therefore, unnecessary correction is not performed, the correction can be performed efficiently, and the time for work can be shortened.

The correction of the scanner 15 and the correction of the printer 16 (print apparatus) can be performed in one string of operation. Therefore, the color accuracy can be easily enhanced in color adjustment.

Specifically, the selection of the print job can be received on the job list screen 221 (see FIG. 6) displayed on the display 22 of the PC 20, and the operation instruction to execute the scanning of the color sample regarding the selected print job and the reading of the read image data can be received on the color sample scan screen 222 (see FIG. 7). When it is determined that it is necessary to correct the device profile corresponding to the printer 16, the operation instruction to print the chart and to correct the device profile can be received on the device profile correction screen 223 (see FIG. 8). When it is determined that the scanner profile corresponding to the scanner 15 needs to be corrected, it is possible to receive the operation instruction to scan the chart and to correct the scanner profile on the scanner profile correction screen 224 (see FIG. 9). It is possible to receive the operation instruction to execute the generating of the color conversion parameter (device link profile) on the adjustment screen 225 (see FIG. 10). The user proceeds with the operation according to the flow of the user interface provided by the PC 20, and with this, it is possible to correct the scanner 15 and/or the printer 16 as necessary and to also generate the color conversion parameter.

Second Embodiment

Next, the second embodiment in which the present invention is applied is described.

The print system according to the second embodiment has a configuration similar to the print system 100 as shown in the first embodiment. Therefore, FIG. 1 to FIG. 3 are to be referred and the illustration and description of the configuration are omitted. The configuration and the process characteristic to the second embodiment are described.

In the second embodiment, the method to determine whether it is necessary to correct the scanner profile and the method to determine whether it is necessary to correct the device profile are described in more detail.

The necessity to correct the scanner profile is determined by the color value (L*a*b* value) obtained from the read value of the read image data of the color sample in the region corresponding to a blank portion of the document image data. The blank portion is the portion where color material such as toner or ink is not applied on the sheet, and the portion showing the color of the sheet itself.

The controller 21 of the PC 20 extracts the region corresponding to the predetermined color from the document image data. Here, as the predetermined color, a color (white) corresponding to a blank portion of the document image data is used. The color corresponding to the blank portion is a color represented by C=0, M=0, Y=0, K=0, for example.

The controller 21 obtains the read value (RGB value before applying a scanner profile) of the read image data in the region corresponding to the region (blank portion) extracted from the document image data.

The controller 21 determines whether the correction of the scanner 15 (scanner profile) is necessary based on the obtained read value, and the scanner profile corresponding to the scanner 15 (scanner). Specifically, the controller 21 converts the read value (RGB value) of the read image data in the region corresponding to the blank portion to the color value (L*a*b* value) using the existing (present) scanner profile, and determines whether the converted data (L*a*b* value) is within a predetermined range determined to be a white color in advance.

For example, regarding the L*a*b* value obtained from the read image data in the region corresponding to the blank portion, when the L* value satisfies the following formula (1) and the a* value and the b* value satisfy the following formula (2), the controller 21 determines that the correction of the scanner 15 (scanner profile) is not necessary.

Regarding the L*a*b* value obtained from the read image data in the region corresponding to the blank portion, when the L* value does not satisfy the following formula (1) or the a* value and the b* value do not satisfy the following formula (2), the controller 21 determines that the correction of the scanner 15 (scanner profile) is necessary.

[Formula 1]

$$80 \leq L^* \leq 100 \quad (1)$$

[Formula 2]

$$0 \leq \sqrt{(a^*)^2+(b^*)^2} \leq 10 \quad (2)$$

The necessity of correction (creating again) of the device profile is determined by the difference between the color value (L*a*b* value) corresponding to the blank portion of the device profile (for example, C=0, M=0, Y=0, K=0) and the color value (L*a*b* value) obtained from the read value of the read image data of the color sample in the region corresponding to the blank portion of the document image data.

The controller 21 of the PC 20 extracts the region corresponding to the predetermined color from the document image data. Here, as the predetermined color, the color (white) corresponding to the blank portion of the document image data is used.

The controller 21 obtains the read value (RGB value before applying the scanner profile) of the read image data in the region corresponding to the region (blank portion) extracted from the document image data.

The controller 21 determines whether the correction of the printer 16 (device profile) is necessary based on the obtained read value, the scanner profile corresponding to the scanner 15 (scanner), and the device profile corresponding to the printer 16 (print apparatus). Specifically, the controller 21 converts the read value (RGB value) of the read image data in the region corresponding to the blank portion to the color value (L*a*b*value) using the existing scanner profile, and determines whether the difference between the converted data (L*a*b* value) and the color value (L*a*b* value) corresponding to the blank in the device profile is within a predetermined range.

For example, when the color value obtained from the read image data in the region corresponding to the blank portion is (L*1, a*1, b*1), the color value corresponding to the blank in the device profile is (L*2, a*2, b*2), and a color difference ΔEab defined by a formula (3) described below satisfies a formula (4) described below, the controller 21 determines that the correction of the printer 16 (device profile) is not necessary.

When the color difference ΔEab defined by the formula (3) described below does not satisfy the formula (4) described below, the controller 21 determines that the correction of the printer 16 (device profile) is necessary.

[Formula 3]

$$\Delta E_{ab} = \sqrt{(L^*_1-L^*_2)^2+(a^*_1-a^*_2)^2+(b^*_1-b^*_2)^2} \quad (3)$$

[Formula 4]

$$\Delta E_{ab} < 1.5 \quad (4)$$

The above method is performed on the premise that there is a blank portion in the document image data. Therefore, when the predetermined color (blank portion) does not exist in the document image data, the controller 21 determines that the correction of the scanner 15 and the printer 16 (print apparatus) is necessary.

Next, the operation in the PC 20 according to the second embodiment is described.

Figure 11:
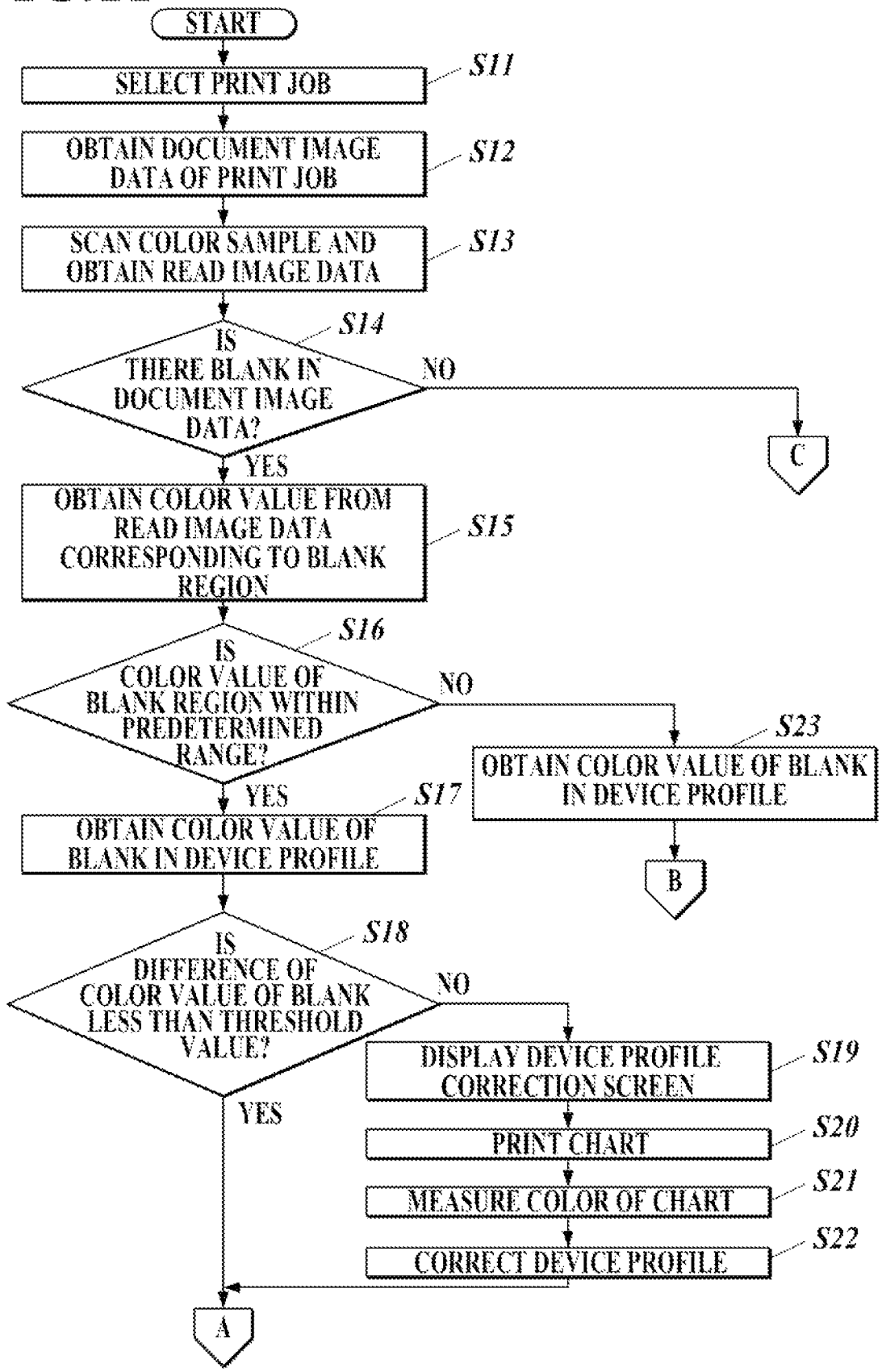
FIG. 11 is a flowchart showing a second color adjustment process according to a second embodiment.
Figure 12:
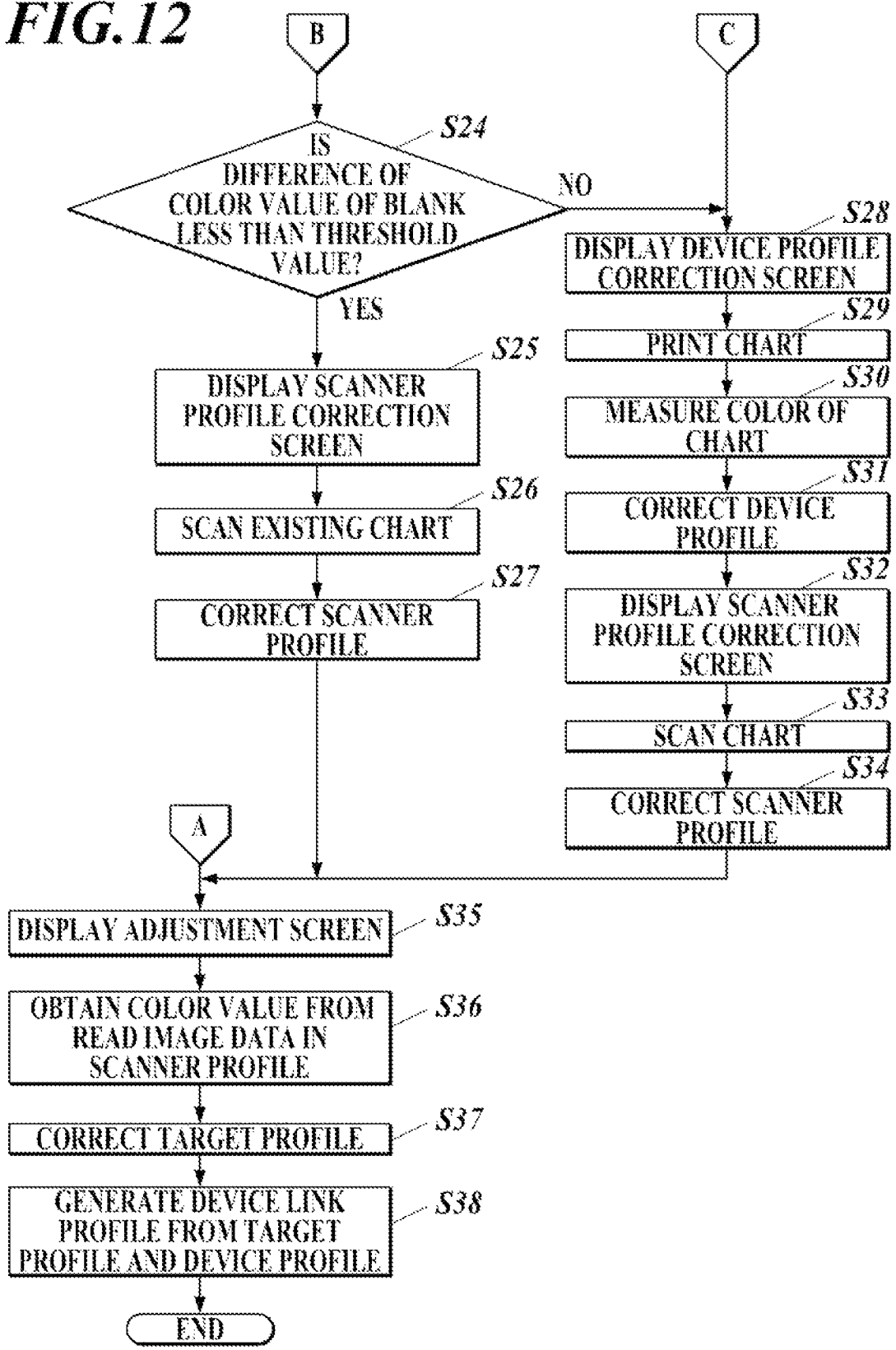
FIG. 12 is a flowchart showing a second color adjustment process according to a second embodiment.

FIG. 11 and FIG. 12 are flowcharts showing the second color adjustment process executed by the PC 20. The process is executed by a software process by the CPU 211 of the controller 21 in coordination with the program stored in the storage 25.

The processes in steps S11 to S13 are the same as the processes in steps S1 to step S3 of the first color adjustment process (see FIG. 5) and the description is omitted.

After step S13, the controller 21 determines whether there is a blank portion in the document image data (step S14).

When there is a blank portion in the document image data (step S14; YES), the controller 21 obtains the color value (L*a*b* value) from the read value (RGB value) of the read image data of the color sample in the region corresponding to the blank region extracted from the document image data and the existing scanner profile (step S15). The scanner profile is obtained from the storage 18 of the multifunction device 10 or the scanner profile stored in advance in the storage 25 is used.

Here, the controller 21 determines whether the color value (L*a*b* value) in the blank region obtained from the read image data of the color sample is within the predetermined range (step S16). Specifically, the controller 21 determines whether the color value in the blank region obtained from the read image data of the color sample satisfies the above-described formulas (1) and (2).

When the color value in the blank region obtained from the read image data of the color sample is within the predetermined range (step S16; YES), the controller 21 determines that the correction of the scanner 15 is not necessary.

Next, the controller 21 obtains the color value (L*a*b* value) in the blank in the device profile (step S17). The device profile is obtained from the storage 18 of the multifunction device 10 or the device profile stored in advance in the storage 25 is used.

Next, the controller 21 determines whether the difference between the color value (L*a*b* value) in the blank region obtained from the read image data of the color sample and the color value (L*a*b* value) in the blank in the device profile is less than the threshold value (step S18). Specifically, the controller 21 determines whether the color difference ΔEab defined in the above-described formula (3) satisfies the above-described formula (4).

When the difference between the color value in the blank region obtained from the read image data of the color sample and the color value in the blank in the device profile is less than the threshold value (step S18; YES), the controller 21 determines that the correction of the printer 16 is not necessary.

In step S18, when the difference between the color value in the blank region obtained from the read image data of the color sample and the color value in the blank in the device profile is not less than the threshold value (step S18; NO), the controller 21 determines that the correction of the printer 16 is necessary.

The controller 21 displays the device profile correction screen 223 (see FIG. 8) on the display 22 (step S19).

When the user operates the operator 23 and presses the chart print button B11 in the device profile correction screen 223, the controller 21 controls the printer 16 of the multifunction device 10 to print the chart (step S20).

Next, the controller 21 controls the color measurer 17 of the multifunction device 10 to measure the color of the chart printed by the printer 16 (step S21). The controller 21 obtains the color measurement result (L*a*b* value) of the chart from the multifunction device 10 through the communicator 24.

Next, the controller 21 corrects the device profile based on the print image data (CMYK value) corresponding to the patches in the printed chart and the color measurement result (L*a*b* value) of the chart (step S22). The controller 21 stores the corrected device profile in the storage 25.

In step S16, when the color value in the blank region obtained from the read image data of the color sample is not within the predetermined range (step S16; NO), the controller 21 determines that the correction of the scanner 15 is necessary.

Next, the controller 21 obtains the color value (L*a*b* value) in the blank in the device profile (step S23).

Next, moving on to FIG. 12, the controller 21 determines whether the difference between the color value (L*a*b* value) in the blank region obtained from the read image data of the color sample and the color value (L*a*b* value) in the blank in the device profile is less than the threshold value (step S24). Specifically, the controller 21 determines whether the color difference ΔEab defined by the above-described formula (3) satisfies the above-described formula (4).

When the difference between the color value in the blank region obtained from the read image data of the color sample and the color value in the blank in the device profile is less than the threshold value (step S24; YES), the controller 21 determines that the correction of the printer 16 is not necessary.

The controller 21 displays the scanner profile correction screen 224 (see FIG. 9) on the display 22 (step S25).

When the user places the existing chart (chart in which the color value in each patch can be understood) on the scanner 15 of the multifunction device 10, and the user operates the operator 23 and presses the scan button B21 in the scanner profile correction screen 224, the controller 21 controls the scanner 15 of the multifunction device 10 to scan the existing chart (step S26). The controller 21 obtains the read image data (RGB value) of the chart from the multifunction device 10 through the communicator 24.

Next, the controller 21 corrects the scanner profile based on the read value (RGB value) read by the scanner 15 in each patch and the color value (L*a*b* value) in each patch (step S27). The controller 21 stores the scanner profile in the storage 25.

In step S14, when there is no blank portion in the document image data (step S14; NO), the controller 21 determines that the correction of the scanner 15 and the printer 16 is necessary and proceeds with the process in step S28.

In step S24, when the difference between the color value in the blank portion obtained from the read image data of the color sample and the color value in the blank in the device profile is not less than the threshold value (step S24; NO), the controller 21 determines that the correction of the printer 16 is necessary and proceeds with the process in step S28.

In step S28, the controller 21 displays the device profile correction screen 223 (see FIG. 8) on the display 22 (step S28).

When the user operates the operator 23 and presses the chart print button B11 in the device profile correction screen 223, the controller 21 controls the printer 16 of the multifunction device 10 to print the chart (step S29).

Next, the controller 21 controls the color measurer 17 of the multifunction device 10 to measure the color of the chart printed by the printer 16 (step S30). The controller 21 obtains the color measurement result (L*a*b* value) of the chart from the multifunction device 10 through the communicator 24.

Next, the controller 21 corrects the device profile based on the print image data (CMYK value) corresponding to each patch in the printed chart and the color measurement result of the chart (L*a*b* value) (step S31). The controller 21 stores the corrected device profile in the storage 25.

Next, the controller 21 displays the scanner profile correction screen 224 (see FIG. 9) on the display 22 (step S32).

When the user places the chart printed in step S29 on the scanner 15 of the multifunction device 10, and the user operates the operator 23, and presses the scan button B21 in the scanner profile correction screen 224, the controller 21 controls the scanner 15 of the multifunction device 10 and scans the chart (step S33). The controller 21 obtains the read image data (RGB value) of the chart from the multifunction device 10 through the communicator 24.

Next, the controller 21 corrects the scanner profile based on the read value (RGB value) read by the scanner 15 in each patch and the color value (L*a*b* value) of each patch measured in step S30 (step S34). The controller 21 stores the corrected scanner profile in the storage 25.

In step S18, when the difference between the color value in the blank region obtained from the read image data in the color sample and the color value in the blank in the device profile is less than the threshold value (step S18; YES), after step S22, after step S27 or after step S34, the controller 21 displays the adjustment screen 225 (see FIG. 10) on the display 22 (step S35).

In the adjustment screen 225, when the user presses the adjust button B31, the controller 21 uses the scanner profile and obtains the color value (L*a*b* value) from the read value (RGB value) of the read image data in the color sample (step S36).

Next, the controller 21 corrects the target profile based on the document image data (CMYK value) and the color value (L*a*b* value) obtained from the read image data of the color sample (step S37).

Next, the controller 21 generates the device link profile based on the target profile and the device profile (step S38). The controller 21 stores the generated device link profile in the storage 25.

The controller 21 applies the device link profile generated in step S38 to the print job selected in step S11. The job setting (color conversion setting) of the print job is changed in the storage 18 of the multifunction device 10 in a state corresponded to the new device link profile.

With this, the second color adjustment process ends.

As described above, according to the second embodiment, the scanner profile and/or the device profile is corrected as necessary and the color conversion parameter (device link profile) is generated. Therefore, it is possible to shorten the time necessary for work and to make the work more efficient when the color accuracy is enhanced in the color adjustment.

Specifically, the color corresponding to the blank portion is used so as to be able to determine whether the correction of the scanner 15 (scanner profile) and the printer 16 (printer profile) is necessary.

Third Embodiment

Next, the third embodiment applying the present invention is described.

The print system according to the third embodiment has a configuration the same as the print system 100 shown in the first embodiment. Therefore, FIG. 1 to FIG. 3 are to be referred and the illustration and the description of the configuration are omitted. Below, the configuration and the process characteristic to the third embodiment are described.

According to the third embodiment, when it is determined that the correction of the scanner profile is necessary, it is automatically determined that the correction of the device profile is also necessary.

The correction of the scanner profile can be performed based on the combination of the color value (L*a*b* value) obtained by measuring the chart with the color measurer 17 (inline color measurer) and the read value (RGB value) obtained by reading the same chart with the scanner 15. Therefore, when it is determined that the correction of the scanner profile is necessary, in addition to the correction of the scanner profile, the process to perform the correction of the device profile is performed. With this, the accuracy of reproducing the color by the printer 16 can be enhanced.

Next, the operation in the PC 20 according to the third embodiment is described.

Figure 13:
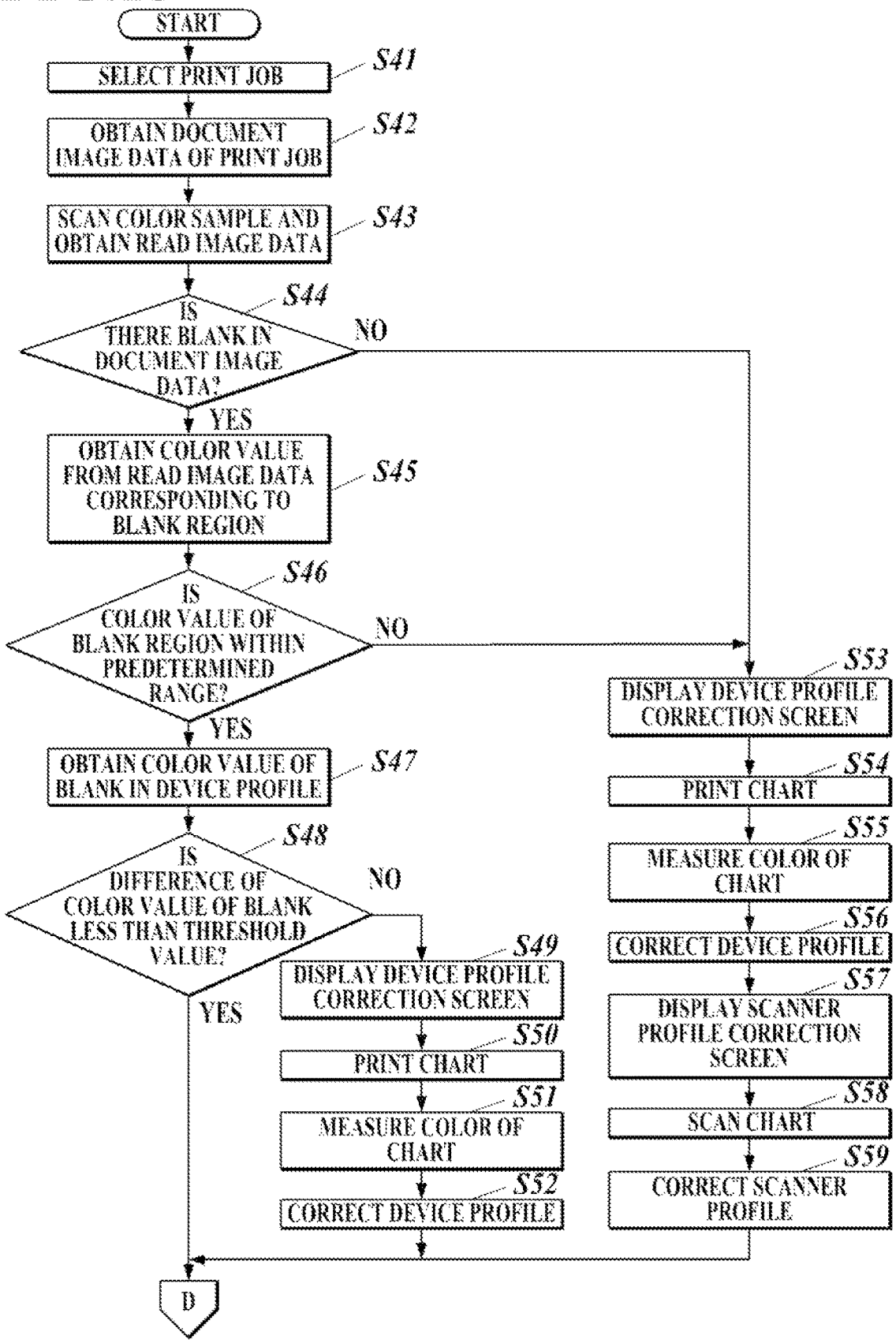
FIG. 13 is a flowchart showing a third color adjustment process according to a third embodiment.
Figure 14:
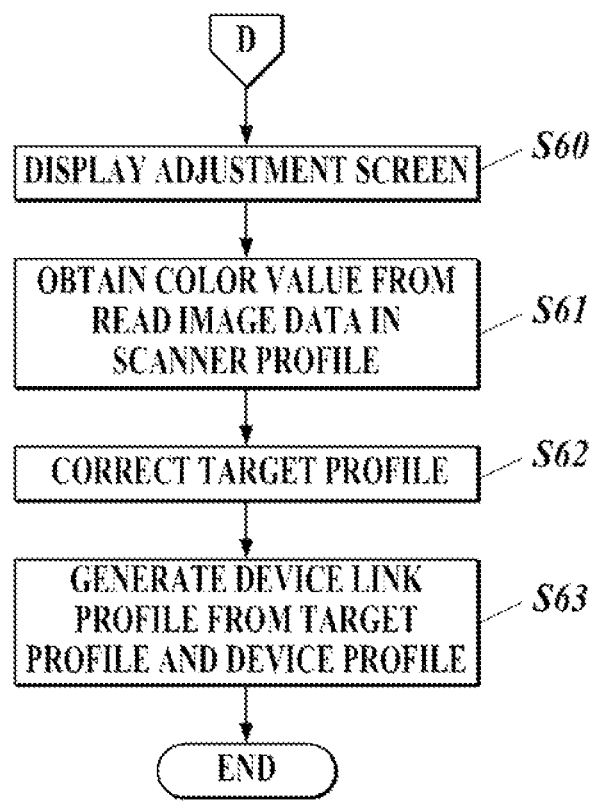
FIG. 14 is a flowchart showing a third color adjustment process according to a third embodiment.

FIG. 13 and FIG. 14 show flowcharts showing the third color adjustment process executed by the PC 20. This process is performed by a software process by the CPU 211 of the controller 21 in coordination with the program stored in the storage 25.

The processes in step S41 to step S52 are similar to the processes in step S11 to S22 of the second color adjustment process (se FIG. 11 and FIG. 12), and the description is omitted.

In step S44, when there is no blank portion in the document image data (step S44; NO), or in step S46, when the color value (L*a*b* value) in the blank region obtained from the read image data of the color sample is not within the predetermined range (step S46; NO), the process proceeds to step S53.

The processes in step S53 to step S59 are the same as the processes in steps S28 to step S34 of the second color adjustment process (see FIG. 11 and FIG. 12), and the description is omitted.

In step S48, when the difference between the color value in the blank region obtained from the read image data of the color sample (L*a*b* value) and the color value (L*a*b* value) in the blank in the device profile is less than the threshold value (step S48; YES), after step S52 or after step S59, the process proceeds to step S60.

The processes in steps S60 to step S63 are the same as the processes in step S35 to step S38 of the second color adjustment process (see FIG. 11 and FIG. 12), and the description is omitted.

With this, the third color adjustment process ends.

As described above, according to the third embodiment, the scanner profile and/or the device profile is corrected as necessary, and the color conversion parameter (device link profile) is generated. With this, it is possible to shorten the time necessary for work and to make the work efficient when the color accuracy in the color adjustment is enhanced.

Moreover, when it is determined that the correction of the scanner profile is necessary, the correction of the device profile is also performed. With this, it is possible to enhance the accuracy of the color reproduced by the printer 16. Moreover, the chart used for the correction of the device profile can also be used for the correction of the scanner profile. Therefore, it is not necessary to create a chart dedicated to be used for only the correction of the scanner profile.

The description of the above embodiments merely describes examples of the control apparatus according to the present invention, and the present invention is not limited to the above. The detailed configuration and the detailed operation of the units included in the apparatus can be suitably modified without leaving the scope of the present invention.

For example, the process characteristic to each embodiment can be combined.

According to the print system described in the above embodiments, the multifunction device 10 including the scanner 15, the printer 16 (print apparatus), and the color measurer 17, is connected with the PC 20 (control apparatus) through the communication network N. Alternatively, the scanner, the print apparatus, the color measurer and the control apparatus can be connected physically or through the communication network. Further, the functions to implement the present invention can be divided among a plurality of apparatuses or may be included in one apparatus. For example, the function which generates the color conversion parameter and the function to correct the scanner 15 and/or the printer 16 can be included in the multifunction device 10 (print apparatus). The display 12 and the operator 13 of the multifunction device 10 can be used as the display in which the various operation screens are displayed and the operator which receives the operation by the user.

The color system of the document image data (CMYK), the color system of the read image data (RGB), the color system of the color value (L*a*b*), the color system (CMYK) of the image data used when the printing is performed by the printer 16 of the multifunction device 10, and the like are not limited to the above examples.

The computer readable medium which stores the program to execute the above processes is not limited to the above examples, and a portable storage medium such as a CD-ROM can be applied. As the medium providing the data of the program through communication lines, a carrier wave can be applied.

Although embodiments of the present invention have been described and illustrated in detail, the disclosed embodiments are made for purposes of illustration and example only and not limitation. The scope of the present invention should be interpreted by terms of the appended claims

What is claimed is:

1. A control apparatus comprising a controller, wherein,
   the controller obtains a job which is executed by a print apparatus and which is corresponded to document image data;
   the controller obtains read image data of a color sample corresponding to the document image data from a scanner, the read image data obtained from an initial scan of the color sample by the scanner, the color sample not being obtained from the job executed by the print apparatus;
   the controller determines whether correction of the scanner is necessary based on the read image data obtained from the initial scan of the color sample by the scanner;
   the controller determines whether correction of the print apparatus is necessary based on the read image data obtained from the initial scan of the color sample by the scanner;
   the controller corrects the scanner and/or the print apparatus based on a result of determination; and
   the controller generates a color conversion parameter regarding a color conversion of the document image data based on a profile corresponding to the scanner and/or the print apparatus after correction, the document image data, and the read image data.

2. The control apparatus according to claim 1, wherein, when it is determined that the correction of the scanner and/or the print apparatus is necessary, the controller controls a display to switch to a screen for correction operation, and the controller controls the display to switch to a predetermined screen after performing the correction of the scanner and/or the print apparatus; and
   when it is determined that the correction of the scanner and/or the print apparatus is not necessary, the controller does not perform the control of the display to switch to the screen for the correction operation and the controller controls the display to switch to the predetermined screen.

3. The control apparatus according to claim 1, wherein,
   the controller extracts a region corresponding to a predetermined color from the document image data;
   the controller obtains a read value of the read image data in a region corresponding to the extracted region; and
   the controller determines whether the correction of the scanner is necessary based on the obtained read value and a scanner profile corresponding to the scanner.

4. The control apparatus according to claim 1, wherein,
   the controller extracts a region corresponding to a predetermined color from the document image data;
   the controller obtains a read value of the read image data in a region corresponding to the extracted region; and
   the controller determines whether the correction of the print apparatus is necessary based on the obtained read value, a scanner profile corresponding to the scanner, and a device profile corresponding to the print apparatus.

5. The control apparatus according to claim 3, wherein, the controller determines that the correction of the scanner and the print apparatus is necessary when the predetermined color does not exist in the document image data.

6. The control apparatus according to claim 3, wherein, the predetermined color is a color corresponding to a blank portion in the document image data.

7. The control apparatus according to claim 1, wherein, as the correction of the scanner, the controller controls the scanner to read a predetermined chart and the controller corrects a scanner profile corresponding to the scanner.

8. The control apparatus according to claim 1, wherein, as the correction of the print apparatus, the controller controls the print apparatus to print a predetermined chart, the controller performs control to measure a color of the predetermined chart, and the controller corrects a device profile corresponding to the print apparatus.

9. The control apparatus according to claim 1, wherein,
   as the correction of the print apparatus, the controller controls the print apparatus to print a predetermined chart, the controller performs control to measure a color of the predetermined chart, and the controller corrects a device profile corresponding to the print apparatus; and
   as the correction of the scanner, the controller controls the scanner to read a predetermined chart and the controller corrects a scanner profile corresponding to the scanner.

10. A control adjustment method executed by a controller of a control apparatus, the method comprising,
    obtaining a job which is executed by a print apparatus and which is corresponded to document image data;
    obtaining read image data of a color sample corresponding to the document image data from a scanner, the read image data obtained from an initial scan of the color sample by the scanner, the color sample not being obtained from the job executed by the print apparatus;
    determining whether correction of the scanner is necessary based on the read image data obtained from the initial scan of the color sample by the scanner;

determining whether correction of the print apparatus is necessary based on the read image data obtained from the initial scan of the color sample by the scanner;

correcting the scanner and/or the print apparatus based on a result of determination; and generating a color conversion parameter regarding a color conversion of the document image data based on a profile corresponding to the scanner and/or the print apparatus after correction, the document image data, and the read image data.

11. A non-transitory computer-readable storage medium storing a program causing a controller of a computer to perform:

obtaining a job which is executed by a print apparatus and which is corresponded to document image data;

obtaining read image data of a color sample corresponding to the document image data from a scanner, the read image data obtained from an initial scan of the color sample by the scanner, the color sample not being obtained from the job executed by the print apparatus;

determining whether correction of the scanner is necessary based on the read image data obtained from the initial scan of the color sample by the scanner;

determining whether correction of the print apparatus is necessary based on the read image data obtained from the initial scan of the color sample by the scanner;

correcting the scanner and/or the print apparatus based on a result of determination; and generating a color conversion parameter regarding a color conversion of the document image data based on a profile corresponding to the scanner and/or the print apparatus after correction, the document image data, and the read image data.

\* \* \* \* \*